Jan. 30, 1923. 1,443,613.
C. J. BEAVER ET AL.
DETECTIVE AND PROTECTIVE DEVICE FOR ELECTRIC CABLES.
FILED OCT 30, 1919.
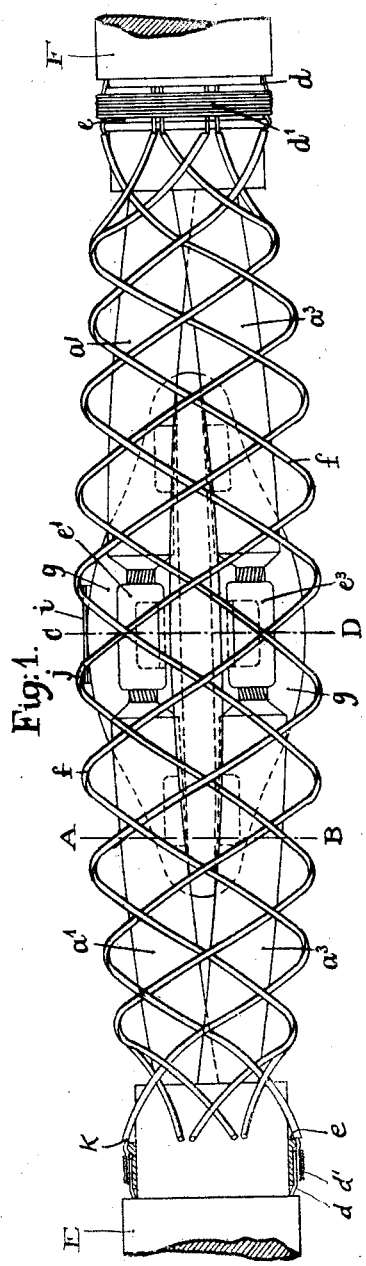
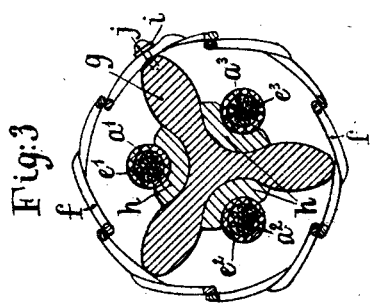
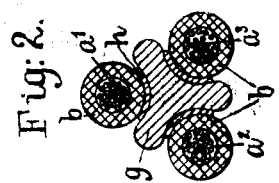
Inventors:—
Charles James Beaver,
Arthur Francis Ward Richards,
Ernest Alexander Claremont.
by their Attorney:

Patented Jan. 30, 1923.

1,443,613

UNITED STATES PATENT OFFICE.

CHARLES JAMES BEAVER, OF HALE, ARTHUR FRANCIS WARD RICHARDS, OF BROOK-LANDS, AND ERNEST ALEXANDER CLAREMONT, OF HIGH LEGH, ENGLAND, ASSIGNORS TO W. T. GLOVER AND COMPANY LIMITED, OF MANCHESTER, ENGLAND, A COMPANY OF GREAT BRITAIN.

DETECTIVE AND PROTECTIVE DEVICE FOR ELECTRIC CABLES.

Application filed October 30, 1919. Serial No. 334,535.

*To all whom it may concern:*

Be it known that we, CHARLES JAMES BEAVER, of Hale, Cheshire, ARTHUR FRANCIS WARD RICHARDS, of Brooklands, Cheshire, and ERNEST ALEXANDER CLAREMONT, of High Legh, Cheshire, England, all subjects of the King of England, have invented certain new and useful Improvements in Detective and Protective Devices for Electric Cables, of which the following is a specification.

This invention relates to electric systems in which there is a subsidiary concentric conductor surrounding the main conductors throughout the length of the cable and preferably continued over the joints of sections of the cable and which is connected to some source of electric energy and to apparatus for detecting faults between any of the main conductors and earth and for protecting the system from any such fault by operating cut-outs, such as for example the system described in the specification of Letters Patent No. 1,308,388 dated 1st July, 1919.

In the specification of Letters Patent No. 1,308,389 also dated 1st July 1919 there was described a conductor for high tension cables to bridge or continue the subsidiary conductor over a joint intended to be formed in a junction box and maintain the continuity of the subsidiary conductor in the form of surrounding and entirely enveloping the main conductors throughout the joint in the junction box.

And in the specification accompanying application of Letters Patent No. 1, 308,390 also dated 1st July 1919 there was described another form of conductor for like purposes suitable for some cases.

In all such systems when a breakdown occurs it is nearly always due to a fault or defect between a main conductor and earth and not between two main conductors and in these few cases where a fault or defect occurs between two main conductors it is nearly always at some particular place where there is abnormal risk of such an accident, such as at the joints of sections of the cable. The object of this invention is to extend the subsidiary conductor which surrounds the conductors of the cable at places of abnormal risk such as at the joints, so that each conductor is separately similarly surrounded or enveloped by it, so that in the case of a defect or breakdown at a joint between two main conductors, it will be detected and the protective apparatus operated. Thus it will be seen that the auxiliary conductor surrounding the main conductor will give a signal directly when any circuit is established owing to a defect in the outside insulation, or owing to a defect in the insulation between one of the main conductors and the subsidiary conductor.

According to this invention we make a metal shielding between the main conductors at places where it is especially desirable, such as at the joints, and connect such shielding electrically to the surrounding or enveloping subsidiary conductor. The shielding may take the form of a metal bar or rod interposed between the main conductors preferably tapered off at each end so as to accommodate itself to the position of conductors spaced apart such as in the manner usual in a junction box. This metal bar or rod has formed thereon longitudinal ribs between which the several main conductors are received and located and by which they are partly enveloped. The spaces between the ribs if desired may be furnished with a lining or with ribs of porcelain (or other suitable insulating material) to reinforce the insulation of the respective main conductors.

The metal bar or rod can be connected to the subsidiary conductor surrounding or enveloping the main conductor in any suitable manner.

An example of our invention is illustrated in the accompanying drawings.

Fig. 1 is an elevation showing the metal shield in position in a three-core cable-joint. Fig. 2 is a cross section on the line A. B. and Fig. 3 a cross section on the line C. D. In all three figures, like letters indicate like parts.

$a^1$, $a^2$ and $a^3$ are the main conductors of the three core cable, each insulated as shown at $b$, $e^1$, $e^2$, and $e^3$ are the ferrules in which the conductor joints in the main conductors are respectively made. An insulated test sheath conductor $d$ is suitably mounted on the adjacent ends of the cable sections E, F, respectively. Ring fittings $e$ are arranged to terminate the test sheath conductor and accommodate the bridging conductors. A sleeve $f$ suitably connected to the ends E, F of the cable is preferably composed of a plurality of metal wire conductors $k$, each of which is separately insulated, as shown. The conductors $d$ and $k$ are secured to the ring $e$ preferably by the insulating wire lappings $d'$. $g$ is the metal shielding between the main conductors and so shaped as to support the sleeve $f$ and space it from the conductor-joints and main conductors, the shielding being tapered so as to accommodate it to the position of the insulated main conductors in the joint and to attain an approximately spherical form at the ends thereof. $h$ are the spacing pieces of porcelain or other suitable insulating material reinforcing the insulation of the main conductors. $i$ is a contact plate and $j$ are screws to clamp the sleeve $f$ to the metal shield $g$ in order to make contact between them, the insulation of the individual wires comprising the sleeve $f$ being removed locally for this purpose.

What we claim as our invention and desire to secure by Letters Patent of the United States is:—

1. In an electric cable joint, the combination with two sections of cable electrically connected, and a subsidiary conductor surrounding the joint between said sections, of a metal shield interposed between the conductors longitudinally throughout the length of the joint and electrically connected to the subsidary conductor.

2. In an electric cable joint, the combination with two sections of electric cable, each comprising a plurality of cables, those of one section being electrically connected with those of the other section, and a subsidiary conductor connected to both sections, of a metal shield interposed between the conductors longitudinally throughout the length of the joint and electrically connected with the subsidiary conductor.

3. In an electric cable joint, the combination with two sections of electric cable, each comprising a plurality of cables, those of one section being electrically connected with those of the other section, and a subsidiary conductor connected to both sections, of a metal shield interposed between said sections and providing a seat for each conductor of both sections, throughout the length of the joint and means electrically connecting said shield and the subsidiary conductor.

4. In an electric cable joint, the combination with two sections of electric cable, each comprising a plurality of cables, those of one section being electrically connected with those of the other section, and a subsidiary conductor connected to both sections, of a metal shield comprising a core-like body having its ends tapered and inserted in the ends of the sections between the conductors thereof and provided with longitudinally extending seats for the conductors of both sections, and means electrically connecting said shield and the subsidiary conductor.

In witness whereof we have signed this specification in the presence of two witnesses.

CHARLES JAMES BEAVER.
ARTHUR FRANCIS WARD RICHARDS.
ERNEST ALEXANDER CLAREMONT.

Witnesses:
F. J. WARREN,
C. A. NEALE.